United States Patent [19]

Moggi et al.

[11] Patent Number: 5,077,097
[45] Date of Patent: Dec. 31, 1991

[54] PROCESS FOR PROTECTING STONY MATERIALS, MARBLE, TILES, AND CEMENT FROM ATMOSPHERIC AGENTS AND POLLUTANTS

[75] Inventors: Giovanni Moggi, Milan; Daria Lenti, Valenza; Desiderata Ingoglia, Milan, all of Italy

[73] Assignee: Ausimont S.r.L., Milan, Italy

[21] Appl. No.: 451,924

[22] Filed: Dec. 18, 1989

[30] Foreign Application Priority Data

Dec. 19, 1988 [IT] Italy .............................. 23004 A/88

[51] Int. Cl.$^5$ .............................................. B05D 3/02
[52] U.S. Cl. .................................... 427/393.6; 427/397
[58] Field of Search ........................... 427/393.6, 397

[56] References Cited

U.S. PATENT DOCUMENTS 4,125,673 11/1978 Roth et al. .......................... 427/387
4,820,588 4/1989 Brinduse et al. ................. 427/372.2
4,902,538 2/1990 Piacenti et al. .................. 427/393.6

FOREIGN PATENT DOCUMENTS 250766 1/1988 European Pat. Off. .

Primary Examiner—Janyce Bell
Attorney, Agent, or Firm—Stevens, Davis, Miller & Mosher

[57] ABSTRACT

The present invention relates to a process for protecting stone materials, marble, tiles and cement as well as articles manufactured from these materials from the decay caused by the atmospheric agents and pollutants. The process uses a mixture consisting of:

1) polytetrafluoroethylene in the form of an aqueous dispersion,
2) an emulsion or a microemulsion of perfluoropolyethers either having or not having functional groups at their ends which is applied onto the surface of the materials or articles.

4 Claims, No Drawings

PROCESS FOR PROTECTING STONY MATERIALS, MARBLE, TILES, AND CEMENT FROM ATMOSPHERIC AGENTS AND POLLUTANTS

FIELD OF THE INVENTION

The present invention relates to a process for protecting stony materials, marble, tiles and cement as well as articles manufactured from the materials from atmospheric agents and pollutants.

BACKGROUND OF THE INVENTION

As it is known, the decay of building materials such as marble, stones, tiles, cement and articles manufactured from such materials is caused by chemical and physical phenomena, both of them occurring in the presence of water.

The physical phenomenon acting on all the building materials is the one which is due to the succession of frost and thaw of the water absorbed in the porosity of the material. This involves variations of specific volume and tension capable of causing fractures or in any case disaggregation among the individual particles which compose the material.

Another chemical-physical phenomenon is the dissolution in water of limestone which is present in the marbles as an essential component and in the stones as a binder, with consequent loss of cohesion of the granules.

Still more important for the decay of the materials and of the articles exposed in the open air is the complex of chemical phenomena. They essentially consist in the aggression of the carbonated parts of the material or article by the agents and pollutants which are present in the air (carbon dioxide, sulphur dioxide, nitrogen oxides, hydrochloric acid, hydrosulphurous acid). Such pollutants react with the material in the presence of water and their concentration is particularly high when rain begins.

It is known too that to eliminate or at least to appreciably reduce the above-mentioned drawbacks, it is necessary to sensibly reduce the penetration speed of the water from outside into the material to be protected.

To achieve this purpose, chemical water-repellent compounds are usually applied onto the outside surface of the material to be protected.

U.S. Pat. No. 4,499,146 describes the use, to this purpose, of neutral perfluoropolyethers, i.e. free from functional groups. European patent application nos. 192,493 and 215,492 describe the use of perfluoropolyethers, an end group or both end groups of which consists/consist of functional groups, such as aminic or estereal groups. The same European patent applications describe also the use of functionalized perfluoropolyethers in admixture with perfluoropolyethers having no functional groups, always in chlorofluorocarbon solution.

European patent application no. 89/106,150 has provided a considerable improvement of the application performances and of the applicative technologies thanks to the use of PFPE-based aqueous emulsions or microemulsions, which eliminate the utilization of chlorofluorocarbon solvents.

The use of these emulsions or microemulsions based on functionalized or not functionalized perfluoropolyethers provides good results for protection of marble and synthetic or natural stones having low and mean porosity. Less satisfactory results are obtained with high porosity materials, i.e. materials having a 20-40% or more of porosity.

The above references are hereby incorporated by reference.

DETAILED DESCRIPTION OF THE INVENTION

It is an object of the present invention to provide a process suited to secure an excellent protection both for low or mean porosity materials and for high porosity materials.

Another object is to provide a process which, with the same amounts of protective agents for functionalized or not functionalized perfluoropolyethers and carried in aqueous microemulsions, secures better protection.

These and still other objects are achieved by the process of the present invention for protecting stone materials, marble, tiles, cement and articles manufactured with said materials from the atmospheric agents and pollutants by applying a protective agent onto the surface of the materials and articles. This process is characterized in that the protective agent consists of a mixture of:

1) polytetrafluoroethylene or a tetrafluoroethylene copolymer containing up to 12% by moles of other perfluorinated monomers, the homopolymer or copolymer being utilized in the form of an aqueous dispersion; and of 2) an aqueous emulsion or microemulsion of a perfluoropolyether consisting of sequences of fluorooxyalkylene units selected from the following ones:

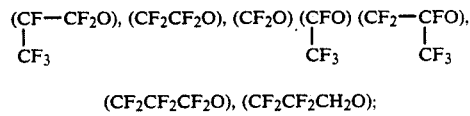

$(CF_2CF_2CF_2O)$, $(CF_2CF_2CH_2O)$;

and having perfluoroalkyl and/or functional end groups.

By "perfluoropolyether functional group" is meant a group which is capable of forming a chemical and/or physical bond with the material to be protected, and is selected form the ones which are capable of forming coordinate bonds and charge transfer bonds with the material.

Preferred functional groups are: —COOH, —CH$_2$OH, —polyoxyalkylene—OH, —C(OH)$_2$—CF$_3$, —CONR$^2$R$^3$, CONHR$^9$, —CONH$_2$, —COOR$^4$, and quaternarized ammonium groups, wherein R$^2$ and R$^3$, equal or different from each other, are alkyl groups, usually containing 1 to 8 carbon atoms; R$^4$ represents an alkyl group, usually containing 1 to 8 carbon atoms or an aromatic or alkyl-aromatic group, such as a benzyl group, and R$^9$ represents an alkyl group, usually containing from 1 to 8 carbon atoms. The end group —COOH is preferably salified.

The quaternarized ammonium group is particularly represented by a —COONR$^5$R$^6$R$^7$R$^8$ group, wherein R$^5$, R$^6$, R$^7$, and R$^8$ represent alkyl groups, usually containing from 4 to 32 carbon atoms in the aggregate.

As starting products it is possible to utilize also perfluoropolyethers with —COCF$_3$, —COF or —SO$_2$F end groups, which during the preparation of the microemulsion hydrolyze to —C(OH)$_2$—CF$_3$—COOH and —SO$_3$H groups and are then salified. The average molecular weight of the perfluoropolyethereal chain ranges from 1,000 to 10,000, preferably from 2,000 to 6,000.

the perfluoropolyethers utilized in the present invention may contain, besides the above-mentioned functional groups, also perfluoroalkyl groups.

The perfluoropolyethers utilized in the present invention may be, in particular, the ones belonging to the following classes:

1.

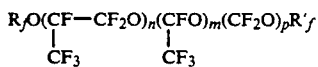

having a random distribution of the perfluorooxyalkylene units, wherein m, n, p have such average values as to meet the above characteristics of average molecular weight;

2. $R_fO(CF_2CF_2O)_n(CF_2O)_mR'_f$, with a random distribution of the perfluorooxyalkylene units, wherein n and m have such average values to meet the above characteristics;

3.

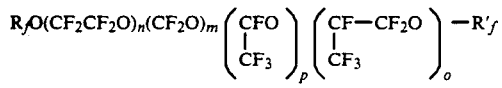

wherein m, n, p, o have such average values to meet the above characteristics;

4.

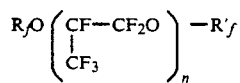

wherein n has such an average value to meet above characteristics;

5. $R_fO(CF_2CF_2O)_nR'_f$, wherein n has such an average value to meet the above characteristics;

6. $R_fO(CF_2CF_2CF_2O)_nR'_f$ or $R_fO(CF_2CF_2CF_2O)_nR'_f$, wherein n has such a value to meet the above characteristics.

$R_f$ and $R'_f$ in formulas 1 to 6 are perfluoroalkyls having 1 to 3 carbon atoms or end groups containing functional groups of the type defined hereinbefore.

As is known, the functional end groups of functionalized perfluoropolyethers are bound to the perfluoropolyether chain by a divalent linking group, particularly by a

group, wherein X=F or $CF_3$.

Other divalent linking groups or radicals are shown in U.S. Pat. No. 4,094,911, herein incorporated by reference.

Perfluoropolyethers of class 1 are commercially known under the trademark Fomblin®Y, the ones of class 2 under the trademark Fomblin®Z, both of them being produced by Montedison. Products of class 4 which are commercially known are Krytox®(Du Pont).

The products of class 5 are described in U.S. Pat. No. 4,523,039; the ones of class 6 are described in European patent no. 148,482 DAIKIN, all hereby incorporated by reference.

The products of class 3 are prepared according to U.S. Pat. No. 3,665,041. Useful products are also the perfluoropolyethers described in U.S. Pat. No. 4,523,039 or in J. Am. Chem. Soc., 107, 1195–1201 (1985), hereby incorporated by reference.

The products of classes 1, 2, and 3, which are obtained through photochemical oxidation processes, are utilizable as rough products of the photooxidation process, which contain peroxide groups —OO— in the chain. The groups are inserted between the perfluorooxyalkylene units.

Perfluoropolyethers which are suited to the use according to the invention are also the ones described in European patent application no. 244,839, comprising functional groups of the above-cited type arranged along the chain and functional or perfluoroalkyl end groups. When preparing the aqueous mixture according to the present invention, it is particularly advantageous to use the perfluoropolyether in the form of an aqueous microemulsion.

The microemulsions to be used in the present invention can be prepared according to the modalities described in European patent application no. 250,766 (incorporated by reference). An essential ingredient is a fluorinated surfactant of the ionic or nonionic type and/or a surfactant compound chosen between a hydrogenated alcohol, containing 1 to 12 carbon atoms, preferably 1 to 6 carbon atoms, and a fluoroalkanol compound.

In particular, the following can be cited as fluorinated surfactant compounds of ionic or nonionic type:

(a) perfluorocarboxylic acids having 5–11 carbon atoms, and their salts;

(b) perfluorosulphonic acids having 5–11 carbon atoms, and their salts;

(c) the nonionic surfactants indicated in European patent application no. 51,526 (incorporated by reference) consisting of a perfluoroalkyl chain and of a polyoxyalkylene hydrophilic head;

(d) mono- and di-carboxylic acids derived from perfluoropolyethers, and their salts;

(e) nonionic surfactants consisting of a perfluoropolyethereal chain bound to a polyoxyalkylene chain;

(f) perfluorinated cationic surfactants or the derivatives from perfluoropolyethers having 1, 2, or 3 hydrophobic chains.

As $C_2F_4$ copolymers suited to the use in the present invention, it is possible to cite for example, the ones containing up to 10 mole % of hexafluoropropene or up to 5 mole % of perfluoroalkyl-perfluorovinyl ethers, in particular, perfluoropropyl-perfluorovin-yl ether used in amounts up to 3 mole %.

The average molecular weight of the $C_2F_4$ homopolymer or copolymer generally ranges from 100,000 to 2,000,000.

The average size of the primary particles of homopolymer or copolymer obtained by emulsion polymerization is generally in the range from 0.05 to 0.5 micron.

Besides polytetrafluoroethylene directly prepared in an aqueous dispersion by emulsion polymerization, it is possible to use PTFE powder obtained from suspension polymerization having particle sizes up to 16 microns. The particles are obtained by treating the dispersion powder in a set-mill and by redispersion in water by means of a nonionic surfactant such as TRITON×100 and with the addition of ammonium perfluorooctanoate.

The amount of polytetrafluoroethylene or of its copolymer in aqueous dispersion in the mix of protective agents according to the present invention, calculated on dry PTFE, generally ranges from 2 to 60% by weight and usually between 2% and 30% by weight for the total of perfluoropolyethers (PFPE).

Preferably the mix contains 5-20% thereof (calculated on dry PTFE) for the total PFPE.

The aqueous dispersion of $C_2F_4$ (co)polymer and perfluoropolyether, according to the invention, permits good treatment protection using perfluoropolyether amounts which are quite lower than the ones used in the prior methods utilizing perfluoropolyether only.

The perfluoropolyether amount to be used in the treatment varies as a function of the porosity of the material to be treated. Generally, it ranges from 10 to 100 g/m$^2$.

EXAMPLES

The following examples are given in order to better illustrate the inventive concept of the present invention, without limiting in any manner the possible embodiments thereof.

EXAMPLE 1

Table 1

Five sandstone (Pietra Serena) specimens having a porosity of 8.5% were used. The specimens had the following dimensions: 100×50×50 mm.

Specimens 1 and 3 were not treated. By brushing, different protective compositions were applied onto specimens 2 and 4, after having divided the 100×50 mm surface into two equal parts (2, 2A, and 4, 4A).

Microemulsions B' was applied by brushing on part 2.

Microemulsion B' added to polytetrafluoroethylene latex was applied on part 2A.

It was operated in manner like that for parts 4 and 4A. The specimen was treated with PTFE latex.

Test 5 proves that PTFE alone does not exert in practice any protective action even if it is applied in higher amounts, equal to the ones used for tests 2A and 4A.

TABLE 1

| Test No. | Treated material | Protective agents | Amount of applied protective agents g/m$^2$ | Amount of absorbed water g/cm$^2$ | Treatment effectiveness % |
|---|---|---|---|---|---|
| 1 | Serena Stone | None | — | 0.0100 | — |
| 2 | Serena Stone | Microem.B' | 30 | 0.0021 | 79 |
| 2A | Serena Stone | Mix 1 | 31 | 0.0012 | 88 |
| 3 | Serena Stone | None | — | 0.0140 | — |
| 4 | Serena Stone | Microem.B' | 40 | 0.0020 | 86 |
| 4A | Serena Stone | Mix 1 | 42 | 0.0010 | 93 |
| 5 | Serena Stone | PTFE dispersion | 9 | 0.012$^6$ | 10 |

TABLE 1-continued

| Test No. | Treated material | Protective agents | Amount of applied protective agents g/m$^2$ | Amount of absorbed water g/cm$^2$ | Treatment effectiveness % |
|---|---|---|---|---|---|

Microemulsion B' = prepared according to European patent application no. 89/106,150 and containing:
Perfluoropolyether 11.3 g
Isopropanol 16.0 g
Aqueous phase 72.7 g
Mix 1 = a mix of microemulsion B' and PTFE latex (420 g/l) such that PTFE (as dry product) is 9% regarding PFPE.
PTFE dispersion at 25% of dry product having primary particles of 0.2–0.3 micron.
Serena Stone = sandstone (having a porosity of 8.5%) with a clay matrix.

Polytetrafluoroethylene is Algoflon in dispersion, produced by Montfluos S.p.A. The sizes of the polytetrafluoroethylene primary particles range from 0.15 to 0.25 micron.

The amounts of protective composition brush-spread on the specimens are expressed in grams per square meter of surface and are reported in Tables 1–4.

The treatment effectiveness is evaluated on the basis of the water amount absorbed by the various specimens in 60 minutes and is expressed by the percent ratio:

$$\frac{\text{(water absorbed by the untreated material) minus (water absorbed by the treated material)}}{\text{(water absorbed by the untreated material)}}$$

The test was carried out by applying to a specimen surface an apparatus consisting of a glass cylinder filled with water and connected with a graduated micropipette, which permits measurement of the water amount absorbed by the contact surface of the specimen. The apparatus is described in the document published by Unesco-Rilem group PEM under number 78,182. The absorbed water reading and the read value are expressed in g/cm$^2$ of surface.

The water amount absorbed by the various specimens (expressed in g/cm$^2$) and the corresponding treatment effectiveness are reported in Table 1.

It is possible to observe that the use of the compositions according to the present invention provides better results than the use of the only perfluoropolyether microemulsion.

EXAMPLE 2

Table 2

Five specimens of Vicenza Stone (100×50×50 mm) (biocalcarenite having a porosity of about 30%) were used. It was operated as in example 1.

The results are reported in Table 2.

It is possible to observe that the use of the compositions according to the present invention provides better results than the use of the only microemulsion.

EXAMPLE 3

Brick specimens having a porosity of 40% and measuring 50×50×50 mm were utilized.

The average absorption value of the untreated specimens (1) was equal to 2.5 g/cm$^2$. This value was used to determine the treatment effectiveness in tests 2-5.

It is possible to observe that the specimens treated with the mixes containing perfluoropolyether microemulsions and polytetrafluoroethylene dispersion (tests 3 and 5) give better results than the ones of reference tests 2 and 4, wherein the PTFE dispersion is not present.

EXAMPLE 4

Specimens of two types of cement (50×50×50 mm)having a porosity of 18% (A) and 25% (B), respectively, were utilized.

Specimens 1 and 6 were not treated. It is possible to observe that the presence of the mix containing PTFE latex (tests 3, 5, and 8) provided better protection results than the ones obtained with perfluoropolyether aqueous microemulsions alone (corresponding reference tests 2 and 7).

TABLE 2
(Example 2)

| Test No. | Treated material | Protective agents | Amount of applied protective agents g/m² | Amount of absorbed water grams/cm² | Treatment effectiveness % |
|---|---|---|---|---|---|
| 1 | Vicenza Stone | — | — | 1.240 | — |
| 2 | Vicenza Stone | Microem. S₂TT | 90 | 0.434 | 65 |
| 2A | Vicenza Stone | MIX 2 | 92 | 0.260 | 79 |
| 3 | Vicenza Stone | — | — | 1.20 | — |
| 4 | Vicenza Stone | Microem. S1PO | 90 | 0.75 | 38 |
| 4A | Vicenza Stone | MIX 3 | 92 | 0.42 | 65 |
| 5 | Vicenza Stone | PTFE dispersion | 15 | 1.100 | 8 |

Microemulsion S₂TT (prepared as described in example 5 of European patent application no. 89/106,150) containing:

| | |
|---|---|
| perfluoropolyether | 19.80% by weight |
| fluorinated surfactant | 14.55% by weight |
| aqueous phase | 65.65% by weight |

Microemulsion S1PO (prepared as described in example 1 of European patent application no. 89/106,150) containing:

| | |
|---|---|
| peroxide perfluoropolyether | 21.5% by weight |
| fluorinated surfactant | 2.0% by weight |
| t.butanol | 9.8% by weight |
| aqueous phase | 66.7% by weight |

Mix 2 = a mix of microemulsion S₂TT ad PTFE latex (420 g/) such that PTFE as dry product is 16% by weight for PFPE.

Mix 3 = like Mix 2, but with S1PO and PTFE equal to 20% by weight.

Test 5: only PTFE latex (420 g/l) is applied, so that PTFE as dry product corresponds to 15 g/m².

TABLE 3

| Test No. | Treated material | Protective agents | Amount of applied protective agents g/m² | Amount of absorbed water g/cm² | Treatment effectiveness % |
|---|---|---|---|---|---|
| 1 | Brick | — | — | from 2.40 to 2.60 depending on the specimen | — |
| 2 | " | S₂TT microemulsion | 30 | 1.37 | 45 |
| 3 | " | MIX 2 | 31 | 1.00 | 60 |
| 4 | " | S₂TT microemulsion | 60 | 0.97 | 61 |
| 5 | " | MIX 2 | 62 | 0.37 | 85 |

Brick 40% porosity
S₂TT microemulsion (see Table 2)
Mix 2 (see Table 2)

TABLE 4

| Test No. | Treated material | Protective agents | Amount of applied protective agents g/m² | Amount of absorbed water g/cm² | Treatment effectiveness % |
|---|---|---|---|---|---|
| 1 | Cement (A) | none | — | 0.32–0.38 depending on the specimen | — |
| 2 | Cement (A) | S₂TT microemulsion | 45 | 0.140 | 60 |
| 3 | Cement (A) | MIX 2 | 46 | 0.078 | 78 |
| 4 | Cement (A) | Microem.A' | 65 | 0.219 | 39 |
| 5 | Cement (A) | Mix A | 65 | 0.091 | 74 |
| 6 | Cement (B) | — | — | from 0.36 to 0.44 | — |
| 7 | Cement (B) | Microm.A' | 65 | 0.214 | 40 |
| 8 | Cement (B) | MIX A | 66 | 0.020 | 94 |

Microemulsion A' = B' (Table 1)
Mix A = microemulsion A' containing PTFE latex equal to 11% (as dry PTFE) with respect to PFPE.
Cement A 18% porosity
Cement B 25% porosity Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A process for protecting marble, stones, tiles, cement, gypsum or wood and of structures obtained from such materials utilized in the building sector, from the decay action caused by atmospheric agents and pollutants, comprising applying onto the materials a protective agent consisting of:

a) polytetrafluoroethylene or tetrafluoroethylene copolymer containing up to 12 mole % of other perfluorinated monomers, the homopolymer or copolymer being in the form of an aqueous dispersion, and of b) an aqueous emulsion or microemulsion of a perfluoropolyether consisting of sequences of fluorooxyalkylene units selected from the following ones:

$(CF-CF_2O)$, $(CF_2CF_2O)$, $(CF_2O)$ $(CFO)$ $(CF_2-CFO)$,
| | |
$CF_3$ $CF_3$ $CF_3$ $(CF_2CF_2CF_2O)$, $(CF_2CF_2CH_2O)$;

having an average molecular weight ranging from 1,000 to 10,000 and having end groups selected from the group consisting of perfluoroalkyl end groups, end groups containing functional groups capable of forming, with the material to be protected, a bond selected from the group consisting of physical bonds, chemical bonds and combinations thereof and perfluoroalkyl end groups together with end groups containing the above said functional groups.

2. The process according to claim 1 wherein the functional groups are selected from: —COOH, $CH_2OH$, polyoxyalkylene—OH, quaternary ammonium groups, —C(OH)$_2$—CF$_3$, —CONR$^2$R$^3$, CONHR$^9$, —CONH$_2$, and —COOR$^4$, wherein R$^2$ and R$^3$, equal or different from each other, represent alkyl groups; R$^4$ represent an alkyl, aromatic or alkyl-aromatic group and R$^9$ represent an alkyl group.

3. The process according to claim 2, wherein the —COOH groups are salified.

4. The process according to claim 1, wherein sue is made of perfluoropolyethers comprising one of the following general formulas:

a) $R_fO(CF-CF_2O)_n(CFO)_m(CF_2O)_pR'_f$
         |           |
         $CF_3$   $CF_3$ b) $R_fO(CF_2CF_2O)_n(CF_2O)_mR'_f$ c) $R_fO(CF_2CF_2O)_n(CF_2O)_m\left(\begin{array}{c}CFO\\|\\CF_3\end{array}\right)_p\left(\begin{array}{c}CF-CF_2O\\|\\CF_3\end{array}\right)_o-R'_f$ d) $R_fO\left(\begin{array}{c}CF-CF_2O\\|\\CF_3\end{array}\right)_n-R'_f$ e) $R_fO(CF_2CF_2O)_nR'_f$ f) $R_fO(CF_2CF_2CF_2O)_nR'_f$ or $R_fO(CF_2CF_2CF_2O)_nR'_f$ where indexes n, m, p, o have such values as to meet the molecular weight characteristics as indicated in claim 1. R$_f$ and R'$_f$ are perfluoroalkyls with 1 to 3 C or end groups containing functional groups of the type defined in claim 1.

* * * * *